(12) United States Patent
Sugimoto et al.

(10) Patent No.: US 11,110,856 B2
(45) Date of Patent: Sep. 7, 2021

(54) VEHICLE LAMP SYSTEM FOR INDICATING AUTONOMOUS DRIVING AND CHARGE LEVEL OF BATTERY

(71) Applicant: KOITO MANUFACTURING CO., LTD., Tokyo (JP)

(72) Inventors: Atsushi Sugimoto, Shizuoka (JP); Toru Takahashi, Shizuoka (JP)

(73) Assignee: Koito Manufacturing Co., LTD.

( * ) Notice: Subject to any disclaimer, the term of this patent is extended or adjusted under 35 U.S.C. 154(b) by 0 days.

(21) Appl. No.: 16/968,564

(22) PCT Filed: Feb. 8, 2019

(86) PCT No.: PCT/JP2019/004548
§ 371 (c)(1),
(2) Date: Aug. 7, 2020

(87) PCT Pub. No.: WO2019/159828
PCT Pub. Date: Aug. 22, 2019

(65) Prior Publication Data
US 2020/0384914 A1   Dec. 10, 2020

(30) Foreign Application Priority Data
Feb. 16, 2018   (JP) .............................. JP2018-026100

(51) Int. Cl.
*B60Q 1/50*       (2006.01)
*F21S 43/237*    (2018.01)
(Continued)

(52) U.S. Cl.
CPC .............. *B60Q 1/50* (2013.01); *B60Q 1/0011* (2013.01); *B60Q 1/2611* (2013.01);
(Continued)

(58) Field of Classification Search
CPC ...... B60Q 1/50; B60Q 1/0011; B60Q 1/2611; B60Q 1/2615; B60Q 2400/20;
(Continued)

(56) References Cited

U.S. PATENT DOCUMENTS

7,721,672 B2 *    5/2010   Nakano ................ G01D 13/265
                                                                    116/288
2014/0253306 A1 *  9/2014   Gillespey ................. B60Q 1/00
                                                                      340/425.5
(Continued)

*Primary Examiner* — Lau K Tso
(74) *Attorney, Agent, or Firm* — Lewis Rice LLC (57) ABSTRACT

Problem: To clearly indicate an autonomous driving state and a charge level of a battery of a vehicle with a single lamp.
Solution: A vehicle headlamp (3) includes a communication lamp (7) for indicating an autonomous driving state of a vehicle while the vehicle is driving, and a lamp ECU (32) for performing control to cause the communication lamp (7) to indicate a charge level of a battery (31) while the vehicle is stationary. The lamp (7) includes an elongated light guide body that continuously extends along a straight line or a curve and a plurality of light emitting devices (22) arranged at an interval in a longitudinal direction of the light guide body. The lamp ECU (32) controls the output of light from each of the light emitting devices (22) to change an illuminated range of the light guide body according to the charge level of the battery (31).

7 Claims, 8 Drawing Sheets

(51) Int. Cl.
  *F21S 43/249*      (2018.01)
  *F21S 43/245*      (2018.01)
  *B60Q 1/00*        (2006.01)
  *B60Q 1/26*        (2006.01)
  *F21Y 115/10*      (2016.01)

(52) U.S. Cl.
  CPC .......... *B60Q 1/2615* (2013.01); *F21S 43/237* (2018.01); *F21S 43/245* (2018.01); *F21S 43/249* (2018.01); *B60Q 2400/20* (2013.01); *F21Y 2115/10* (2016.08)

(58) Field of Classification Search
  CPC ...... F21S 43/237; F21S 43/249; F21S 43/245; F21Y 2115/10
  USPC ................. 362/511; 340/455, 543, 555, 558
  See application file for complete search history.

(56) References Cited

U.S. PATENT DOCUMENTS

| | | | |
|---|---|---|---|
| 2017/0240060 A1* | 8/2017 | Roberts | B60Q 1/0076 |
| 2018/0065544 A1* | 3/2018 | Brusco | B60L 1/14 |
| 2020/0005564 A1* | 1/2020 | Coburn | B60L 50/60 |
| 2020/0049534 A1* | 2/2020 | Kennedy | G01D 7/005 |
| 2020/0189450 A1* | 6/2020 | Jeon | F21S 41/24 |
| 2020/0278100 A1* | 9/2020 | Siakos | B60Q 1/2607 |
| 2020/0413519 A1* | 12/2020 | Shitara | H05B 47/115 |

* cited by examiner

VEHICLE LAMP SYSTEM FOR INDICATING AUTONOMOUS DRIVING AND CHARGE LEVEL OF BATTERY

CROSS REFERENCE TO RELATED APPLICATION(S)

This application is a § 371 U.S. National Phase of International Application Serial No.: PCT/JP2019/004548 filed Feb. 8, 2019, which is turn claims priority to Japanese Patent Application Serial No: 2018-026100, filed Februa 16, 2018. The entire disclosure of all the above documents is herein incorporated by reference.

TECHNICAL FIELD

The present invention relates to a vehicle lamp system with lamps for indicating an autonomous driving state of a vehicle and the charge level of a battery mounted on board of the vehicle.

BACKGROUND OF THE INVENTION

Conventionally, lamps have been known that indicate an autonomous driving state of a vehicle. For example, Patent Document 1 describes a technology for switching the indication pattern of lamps according to the driving state of an autonomous driving vehicle. Conventionally, lamps have also been known that indicate the charge level of an electric vehicle. For example, Patent Document 2 proposes a technology in which a plurality of LEDs are arranged linearly to indicate the charge level of a battery by turning on and off each of the LEDs.

PRIOR ART DOCUMENTS

Patent Literature

Patent Document 1: Japanese Published Unexamined Patent Application No. 2015-71340
Patent Document 2: U.S. Published Patent Application No. 2014/0253306

SUMMARY OF THE INVENTION

Problem to be Solved by the Invention

According to the prior art, however, it has not been possible to indicate an autonomous driving state and the charge level of a battery of a vehicle with a single lamp. In addition, in the lamps of Patent Document 2, a plurality of LEDs are sequentially turned on while the battery is charged; however, there is a problem where, if an autonomous driving state is indicated in the same pattern as during battery charging, that indication is not easily distinguishable from the patterns of emission of light from the turn signal lamps during the driving of the vehicle.

Therefore, an object of the present invention is to provide a vehicle lamp system capable of clearly indicating an autonomous driving state and the charge level of a battery of a vehicle with a single lamp.

Means to Solve the Problem

In order to solve the above-described problem, a vehicle lamp system of the present invention is characterized by comprising a lamp for indicating an autonomous driving state of a vehicle while the vehicle is driving, and a control unit for performing control to cause the lamp to indicate a charge level of a battery while the vehicle is stationary, wherein the lamp includes an elongated light guide body that continuously extends along a straight line or a curve and a plurality of light emitting devices arranged at an interval in a longitudinal direction of the light guide body, and wherein the control unit controls the output of light from each of the light emitting devices to change an illuminated range of the light guide body according to the charge level of the battery.

In this case, the configuration of the light emitting devices of the lamp is not limited to any particular one; preferably, in order to nearly evenly distribute the light from the light emitting devices to each portion of the light guide body, the light guide body includes a trunk portion for indicating the autonomous driving state and the charge level to an outside of the vehicle, and a plurality of branch portions branching out from the trunk portion toward respective light emitting devices.

More preferably, in order to clearly indicate the charge level of the battery with the illuminated range of the light guide body, the trunk portion includes one end for indicating a minimum charge level and another end for indicating a full charge level, and the plurality of branch portions are provided obliquely with respect to the trunk portion so as to extend from the respective light emitting devices toward the one end of the trunk portion.

Although the pattern of indication by the lamp is not limited to any particular one, preferably, the pattern of indication while the vehicle is driving is different from the pattern of indication while the vehicle is stationary. For example, the autonomous driving state and the charge level may be indicated in different luminescent colors by causing the lamp to emit green light during driving and emit white or yellow light during charging, etc. Alternatively, the autonomous driving state and the charge level may be indicated in different patterns of emission by turning on all the light emitting devices during driving and sequentially turning on the light emitting devices while the vehicle is stationary, etc.

The lamp may not have to be disposed in any specific location. For example, lamps may be mounted in right and left headlamps disposed at the front of a vehicle body. The lamp may also be disposed in the proximity of a charging inlet. The lamp may also be disposed on a roof portion of the vehicle body to allow the charge level to be seen from all around the vehicle body.

Advantageous Effects of the Invention

According to the vehicle lamp system of the present invention, as a lamp for indicating an autonomous driving state of a vehicle is provided with an elongated light guide body and a plurality of light emitting devices and configured to indicate the charge level of a battery with the illuminated range of the lamp, a beneficial effect is provided that an autonomous driving state and the charge level can be clearly indicated with a single lamp.

DESCRIPTION OF EMBODIMENTS

Figure 1:
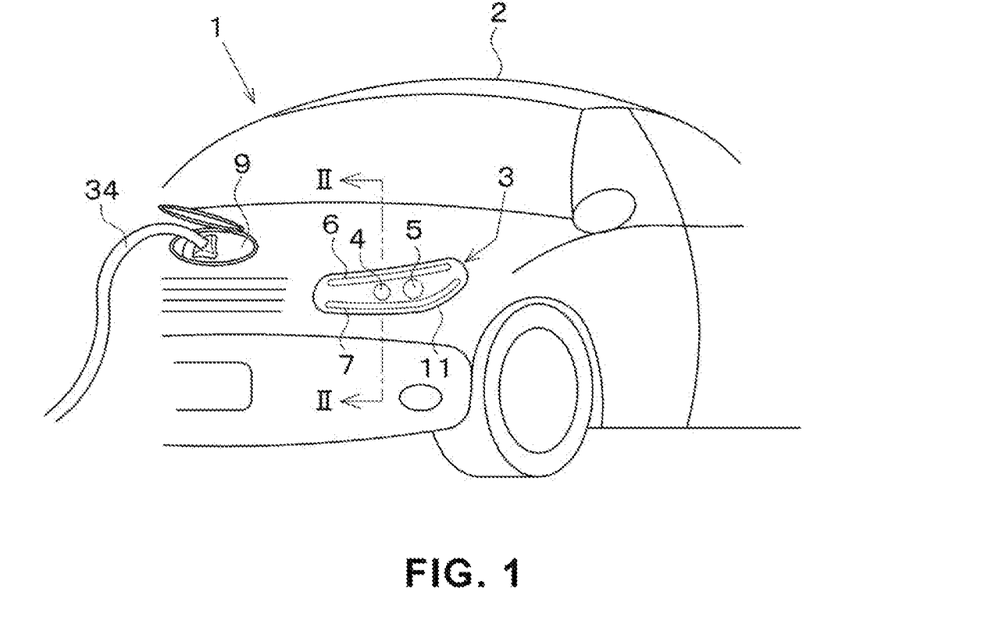
FIG. 1 is a partial perspective view of a vehicle showing one embodiment of the present invention.

An embodiment of the present invention will be described hereinafter based on the drawings. The vehicle 1 shown in FIG. 1 is provided with a pair of left and right headlamps 3 at the front of a vehicle body 2. A low beam lamp 4, a high beam lamp 5, a turn signal lamp (or a daylight running lamp) 6, and a communication lamp 7 are provided in the housing of the headlamp 3. Additionally, in the vehicle lamp system of this embodiment, the communication lamps 7 function as lamps to indicate an autonomous driving state to pedestrians and other vehicles while the vehicle 1 is driving and also to indicate the charge level of a battery 31 (see FIG. 4) mounted on board of the vehicle 1 to the driver while the vehicle is stationary.

Figure 2:
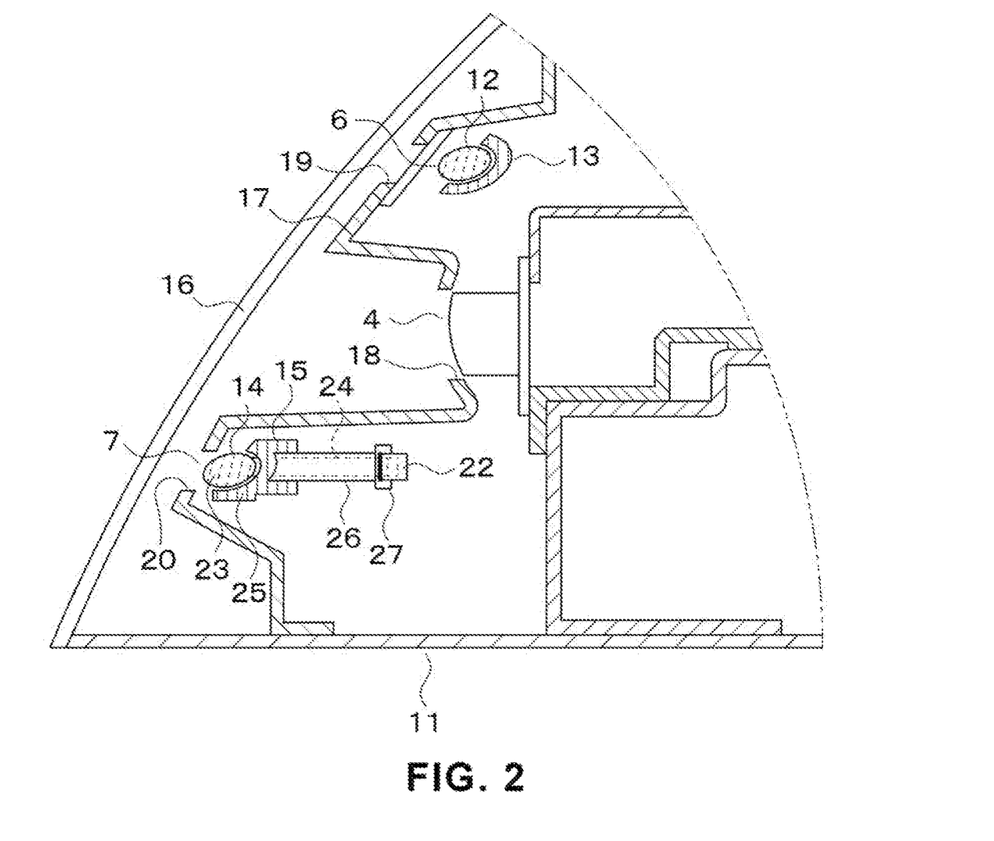
FIG. 2 is a cross-sectional view showing the internal structure of the vehicle headlamp taken along line II-II of FIG. 1.

As shown in FIG. 2, the turn signal lamp 6 is disposed above the low beam lamp 4 and provided with an elongated light guide body 12 that extends from side to side and a shade 13 that covers the light guide body 12 from behind. The communication lamp 7 is disposed below the low beam lamp 4 and, similar to the turn signal lamp 6, provided with an elongated light guide body 14 that extends from side to side and a shade 15 that covers the light guide body 14 from behind. An extension 17 provided on the inside of a front cover 16 of the housing 11 has formed therein an opening 18 that allows the light emission from the low beam lamp 4 to come out of the vehicle, a slit 19 that allows the light emission from the turn signal lamp 6 to come out of the vehicle body, and a slit 20 that allows the light emission from the communication lamp 7 to come out of the vehicle.

Figure 3:
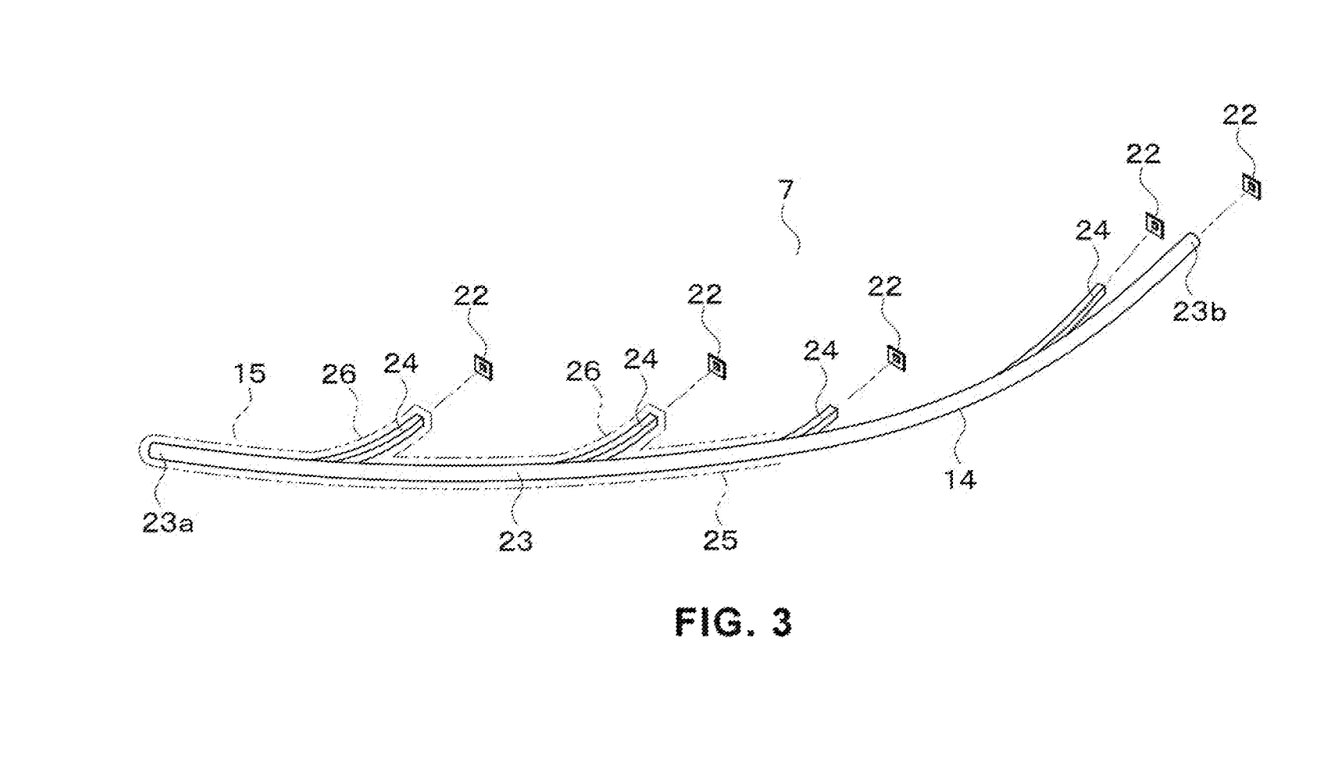
FIG. 3 is a perspective view showing the communication lamp of the headlamp.

As shown in FIG. 3, the communication lamp 7 includes, for example, five light emitting devices 22 comprised of LEDs in the longitudinal direction of the light guide body 14. The light guide body 14 includes a trunk portion 23 continuously extending along a gentle curvature of a curve and a plurality of branch portions 24 branching out of the trunk portion 23 to reach the light emitting devices 22, and is wholly and integrally formed of a transparent resin. Moreover, a shade 15 is comprised of an elongated portion 25 that covers the trunk portion 23 and short portions 26 that cover the branch portions 24. Each of the light emitting devices 22 is held by a holder 27 (see FIG. 2) at the top end of the respective short portion 26 so as to oppose the top surface of the branch portion 24, and is arranged at a predetermined interval in the longitudinal direction of the trunk portion 23.

The trunk portion 23 of the light guide body 14 is provided with one end 23a for indicating the minimum charge level of the battery 31 and the other end 23b for indicating the full charge level of the battery 31. The branch portions 24 are provided obliquely with respect to the trunk portion 23 so as to extend from the respective light emitting devices 22 toward the one end 23a of the trunk portion 23, i.e., toward the end for indicating the minimum charge level.

And, during charging, a length or range of the trunk portion 23 is illuminated by the light from the light emitting device (s) 22 in accordance with the charge level of the battery, and the illuminated range is exposed to the front of the vehicle through the cover 16 via the slit 20.

Figure 4:
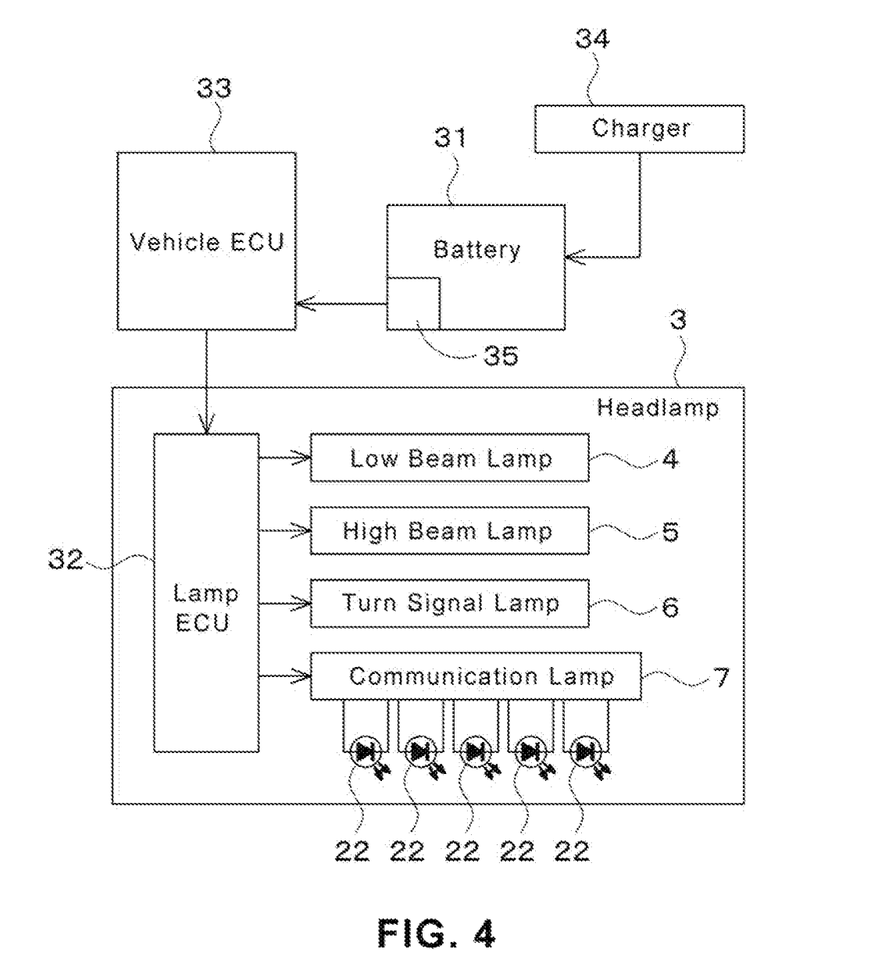
FIG. 4 is a block diagram showing the control system of the headlamp.

As shown in FIG. 4, a lamp ECU 32 that serves as a control unit for controlling the output of light from four lamps 4, 5, 6, and 7 is disposed in the housing 11 of the headlamp 3. While the vehicle 1 is driving in an autonomous driving mode, the lamp ECU 32 turns on or flashes all the five light emitting devices 22 in response to a command from a vehicle ECU 33 to cause the communication lamp 7 to indicate the autonomous driving state of the vehicle 1. Furthermore, while the battery is being charged in the stationary vehicle, the lamp ECU 32 individually controls the turning on and off of the five light emitting devices 22 to change the illuminated range of the trunk portion 23 according to the charge level so as to allow the communication lamp 7 to indicate the charging state of the battery 31 in a pattern of emission different from during the autonomous driving state.

It should be noted that the battery charge level is detected by a voltage sensor 35 attached to the battery 31 and communicated to the lamp ECU 32 via the vehicle ECU 33. Charge indication may be started when a charger 34 is connected to the charging inlet 9 (see FIG. 1) on the vehicle body 2. Also, charge indication may be started when the vehicle 1 is stopped in order to allow the driver to check the charge level when charging is not in progress. Charge indication may be terminated after a predetermined time has elapsed since full charging, or after a predetermined time has elapsed since the start of the charge indication. Alternatively, the charge level of the battery may be indicated in a luminescent color different from when autonomous driving is indicated; the luminescent color may also be changed according to the charge level.

Figure 5:
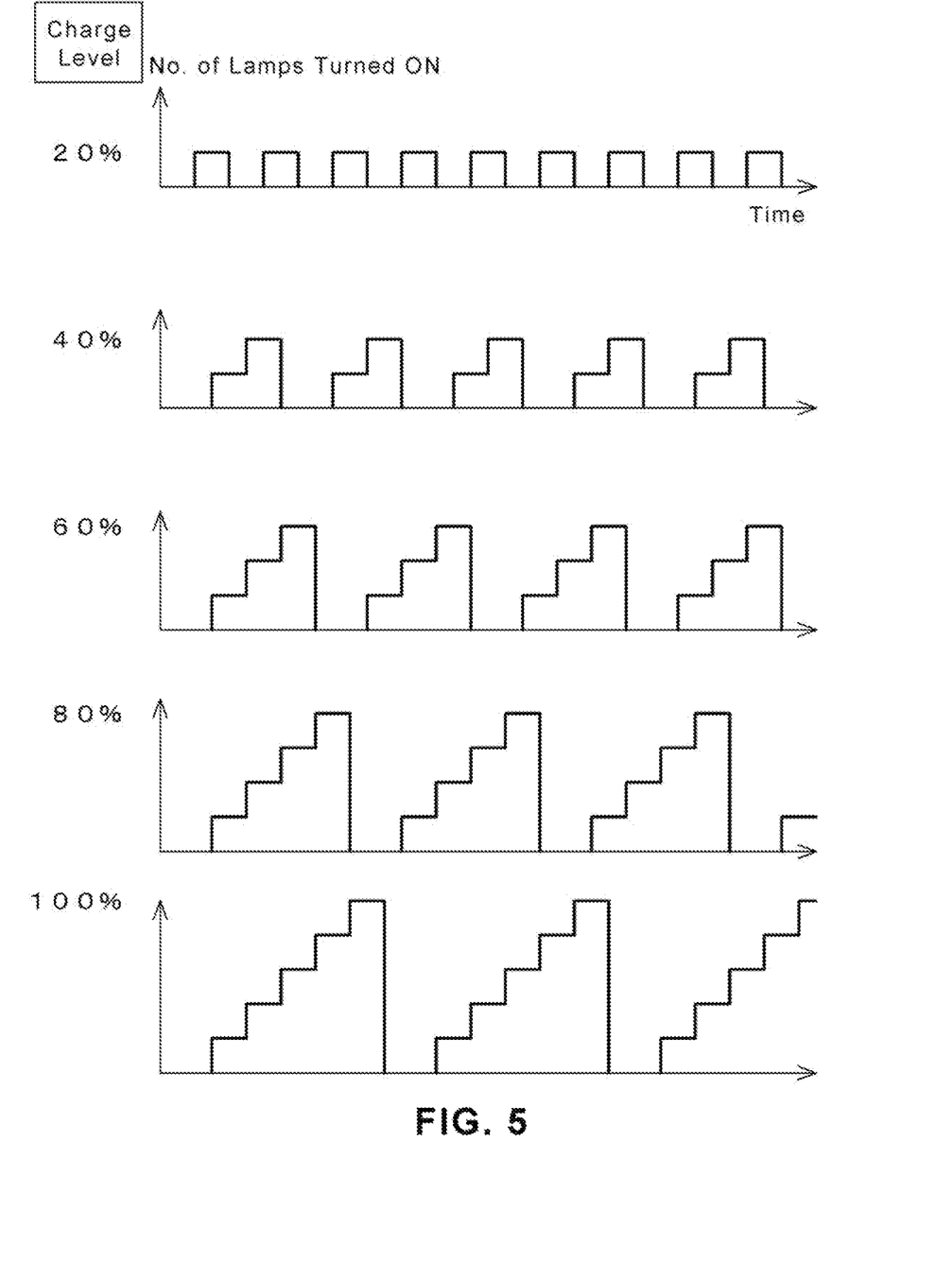
FIG. 5 is a characteristic diagram showing the charge indication patterns by the communication lamp.
Figure 6:
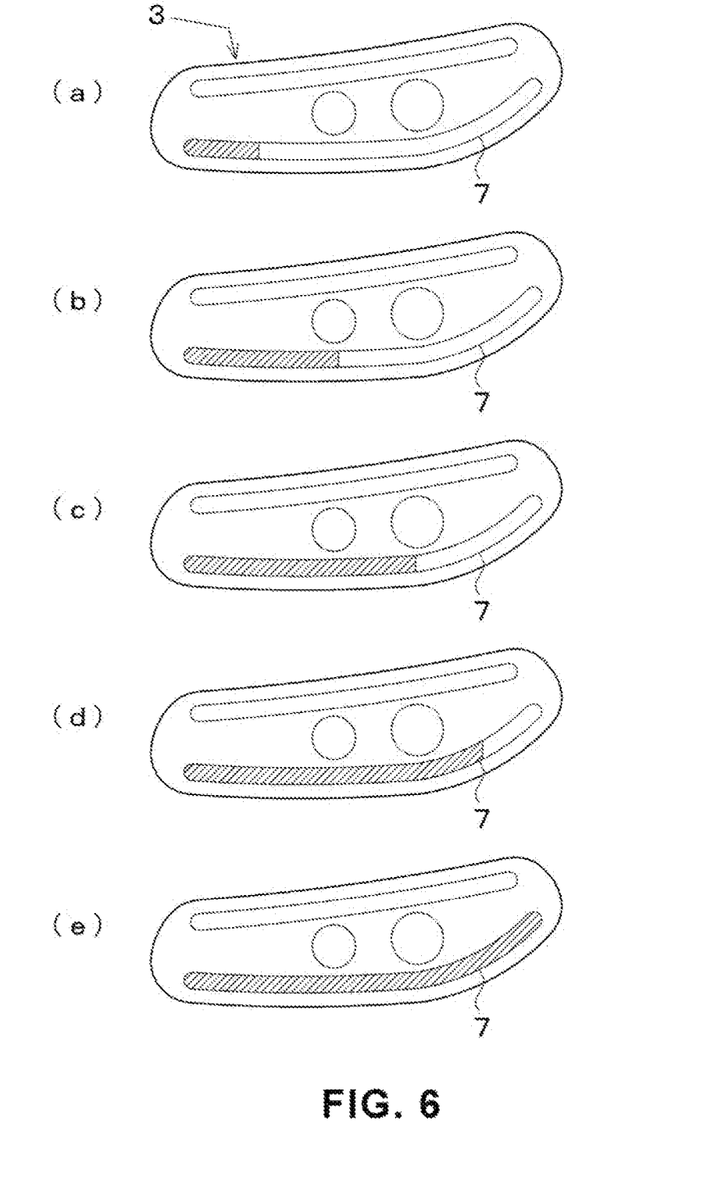
FIG. 6 is a front view also showing the charge indication patterns.

FIGS. 5 and 6 illustrate examples of patterns of emission of light from the communication lamp 7 to indicate the charging state. In this case, the number of light emitting devices 22 that are turned on increases sequentially according to the charge level of the battery 31. As shown in FIG. 5, when the charge level is 20%, one light emitting device 22 flashes at a predetermined cycle, so that as shown in FIG. 6(a), the communication lamp 7 indicates the minimum charge level at one end thereof. When the charge level reaches 40%, two light emitting devices 22 turn on one after another and then turn off at the same time to increase the illuminated range of the communication lamp 7 as shown in FIG. 6(b).

When the charge level reaches 60%, three light emitting devices 22 turn on one after another and then turn off all at once to further increase the illuminated range of the communication lamp 7 as shown in FIG. 6(c). When the charge level reaches 80%, four light emitting devices 22 turn on one after another and then turn off all at once to further increase the illuminated range of the communication lamp 7 as shown in FIG. 6(d). Subsequently, when full charge is achieved (100%), the five light emitting devices 22 turn on one after another and then turn off all at once to maximize the illuminated range of the communication lamp 7 (i.e., emission along the entire length thereof) as shown in FIG. 6(e). Therefore, the driver can easily check the charge level of the battery 31 at a glance based on the gradual increase in the illuminated range.

Figure 7:
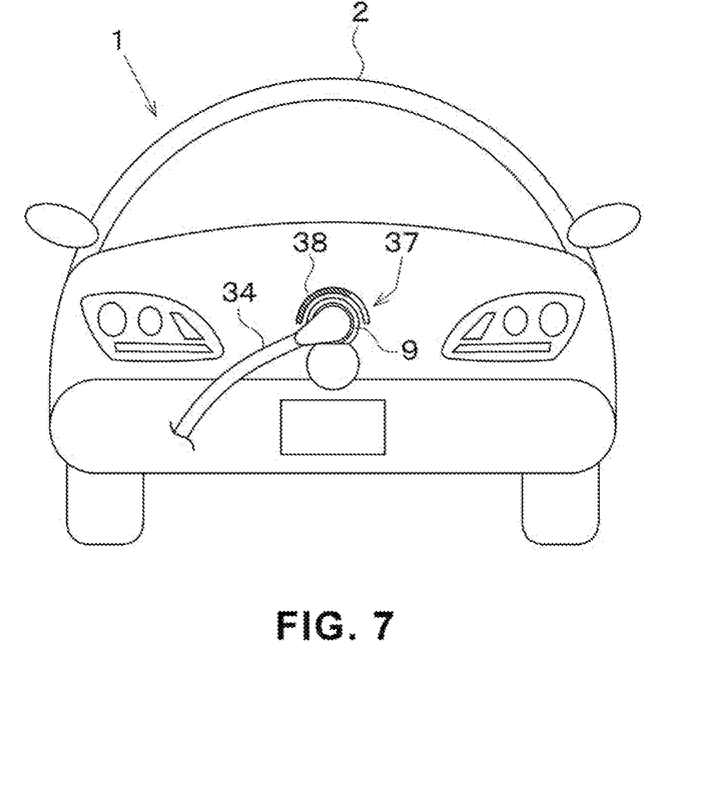
FIG. 7 is a front view of a vehicle showing another embodiment of the present invention.

It should be noted that the present invention is not limited to the above embodiments and can be practiced by changing the shape or the configuration of some parts as appropriate as set forth below without departing from the spirit of the present invention:

(1) As shown in FIG. 7, an identification lamp 37 may be installed in the proximity of the charging inlet 9 at the front of the vehicle body, a narrow semicircular light guide body 38 being used as the identification lamp 37 so as to allow the light guide body 38 to function in the same manner as the communication lamp 7 shown in FIG. 3.

Figure 8:
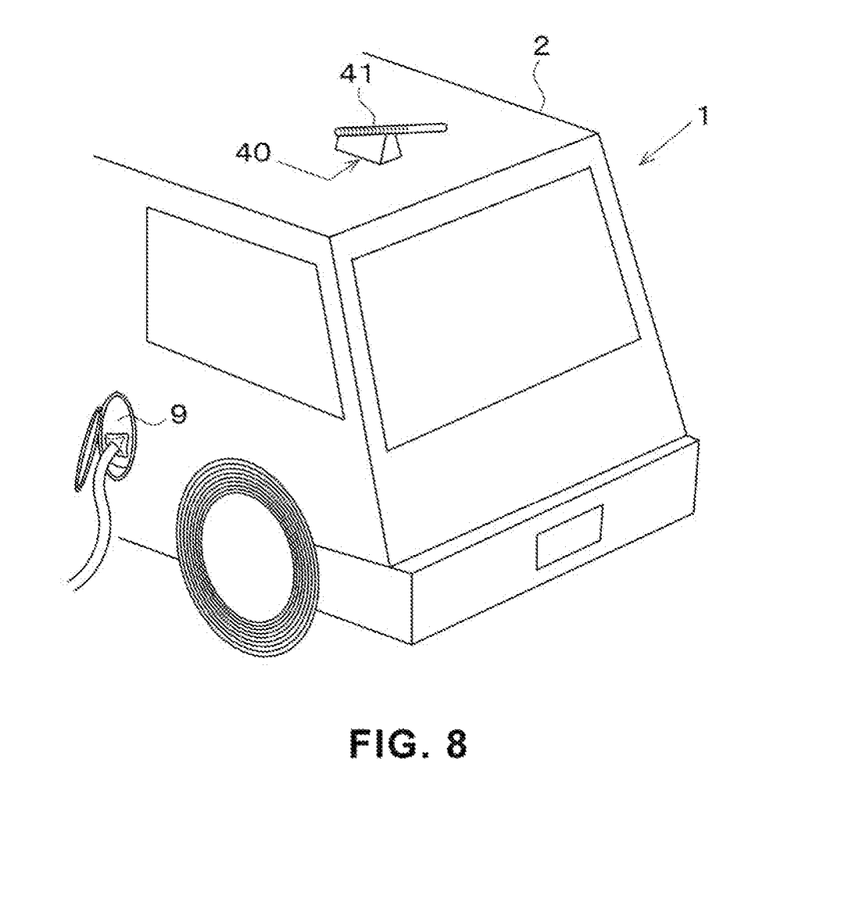
FIG. 8 is a perspective view of a vehicle showing still another embodiment of the present invention.

(2) As shown in FIG. 8, an antenna 40 may be installed on the roof portion of the vehicle body 2, and an indicating lamp 41 comprised of a narrow light guide body may be provided on the antenna 40 so as to allow the indicating lamp 41 to function in the same manner as the communication lamp 7 shown in FIG. 3.

(3) The vehicle ECU 33 is allowed to function as a control unit in the vehicle lamp system shown in FIG. 4 to perform control to cause the communication lamp 7 to indicate the charge level of the battery 31 while the vehicle 1 is stationary.

EXPLANATION OF REFERENCE NUMERALS

1 Vehicle
2 Vehicle body
3 Headlamp
7 Communication lamp
14 Light guide body
22 Light emitting device
23 Trunk portion
24 Branch portion
32 Lamp ECU
37 Identification lamp
38 Light guide body
40 Antenna
41 Indicating lamp

The invention claimed is:

1. A vehicle lamp system comprising:
a lamp for indicating an autonomous driving state of a vehicle while the vehicle is driving, and
a control unit for performing control to cause the lamp to indicate a charge level of a battery while the vehicle is stationary,
wherein the lamp includes an elongated light guide body that continuously extends along a straight line or a curve and a plurality of light emitting devices arranged at an interval in a longitudinal direction of the light guide body,
wherein the light guide body includes a trunk portion for indicating the autonomous driving state and the charge level to an outside of the vehicle, and a plurality of branch portions branching out from the trunk portion toward respective light emitting devices, and
wherein the control unit controls the output of light from each of the light emitting devices to change an illuminated range of the light guide body according to the charge level of the battery.

2. The vehicle lamp system of claim 1:
wherein the trunk portion includes one end for indicating a minimum charge level of the battery and another end for indicating a full charge level of the battery, and the plurality of branch portions are provided obliquely with respect to the trunk portion so as to extend from the respective light emitting devices toward the one end of the trunk portion.

3. The vehicle lamp system of claim 1, wherein the lamp indicates the autonomous driving state and the charge level in different luminescent colors.

4. The vehicle lamp system of claim 1, wherein the lamp indicates the autonomous driving state and the charge level in different patterns of emission.

5. The vehicle lamp system of claim 1, wherein the lamp is disposed at a front of a vehicle body.

6. The vehicle lamp system of claim 1, wherein the lamp is disposed in the proximity of a charging inlet on the vehicle body.

7. The vehicle lamp system of claim 1 wherein the lamp is disposed on a roof portion of the vehicle body.

* * * * *